United States Patent [19]

Ikeda

[11] Patent Number: 5,319,574
[45] Date of Patent: Jun. 7, 1994

[54] STATUS CHANGE MONITORING APPARATUS

[75] Inventor: Nobuo Ikeda, Kawasaki, Japan

[73] Assignee: Fujitsu Limited, Kawasaki, Japan

[21] Appl. No.: 902,421

[22] Filed: Jun. 24, 1992

Related U.S. Application Data

[63] Continuation of Ser. No. 683,478, Apr. 9, 1991, abandoned, which is a continuation of Ser. No. 457,510, Dec. 27, 1989, abandoned.

[30] Foreign Application Priority Data

Dec. 27, 1988 [JP] Japan .................. 63-329835

[51] Int. Cl.⁵ ................ G06F 15/00; G06F 15/46
[52] U.S. Cl. ................. 364/551.01; 340/825.15
[58] Field of Search ............ 364/550, 551.01; 340/501, 511, 661, 825.06, 825.15, 825.32, 870.01, 870.02, 870.09

[56] References Cited

U.S. PATENT DOCUMENTS

| | | | |
|---|---|---|---|
| 3,832,688 | 8/1974 | Strojny et al. | 340/825.06 |
| 4,346,439 | 8/1982 | Huno et al. | 364/200 |
| 4,393,461 | 7/1983 | Holtey et al. | 340/825.06 X |
| 4,441,162 | 4/1984 | Lillie | 364/900 |
| 4,543,567 | 9/1985 | Shirata et al. | 340/511 X |
| 4,618,965 | 10/1986 | Maxwell et al. | 340/825.06 X |
| 4,621,335 | 11/1986 | Bluish et al. | 364/550 |
| 4,797,652 | 1/1989 | Hall | 340/146.2 |

FOREIGN PATENT DOCUMENTS

56-4835 1/1981 Japan .
58-19969 2/1983 Japan .
61-267825 11/1986 Japan .

OTHER PUBLICATIONS

"Direct Memory Access" *Interrupts, Direct Memory Access, and Processes*, Ch. 11 pp. 340-344, Date Unknown.

Primary Examiner—Thomas G. Black
Assistant Examiner—Michael Zanelli
Attorney, Agent, or Firm—Staas & Halsey

[57] ABSTRACT

A status change monitoring apparatus monitors an apparatus to be monitored to indicate a monitoring result. The monitoring apparatus comprises a new data latching unit for latching new data, an old data latching unit for latching old data received before the reception of the new data, a comparing and storing unit for comparing the new data and the old data and for storing a comparison result, and a processing unit for checking the comparison result to determine whether there is a difference between the old data and the new data. The processing unit processes the new data to indicate the monitoring result only when there is a difference between the old data and the new data, thereby shortening the processing time required for comparing.

9 Claims, 10 Drawing Sheets

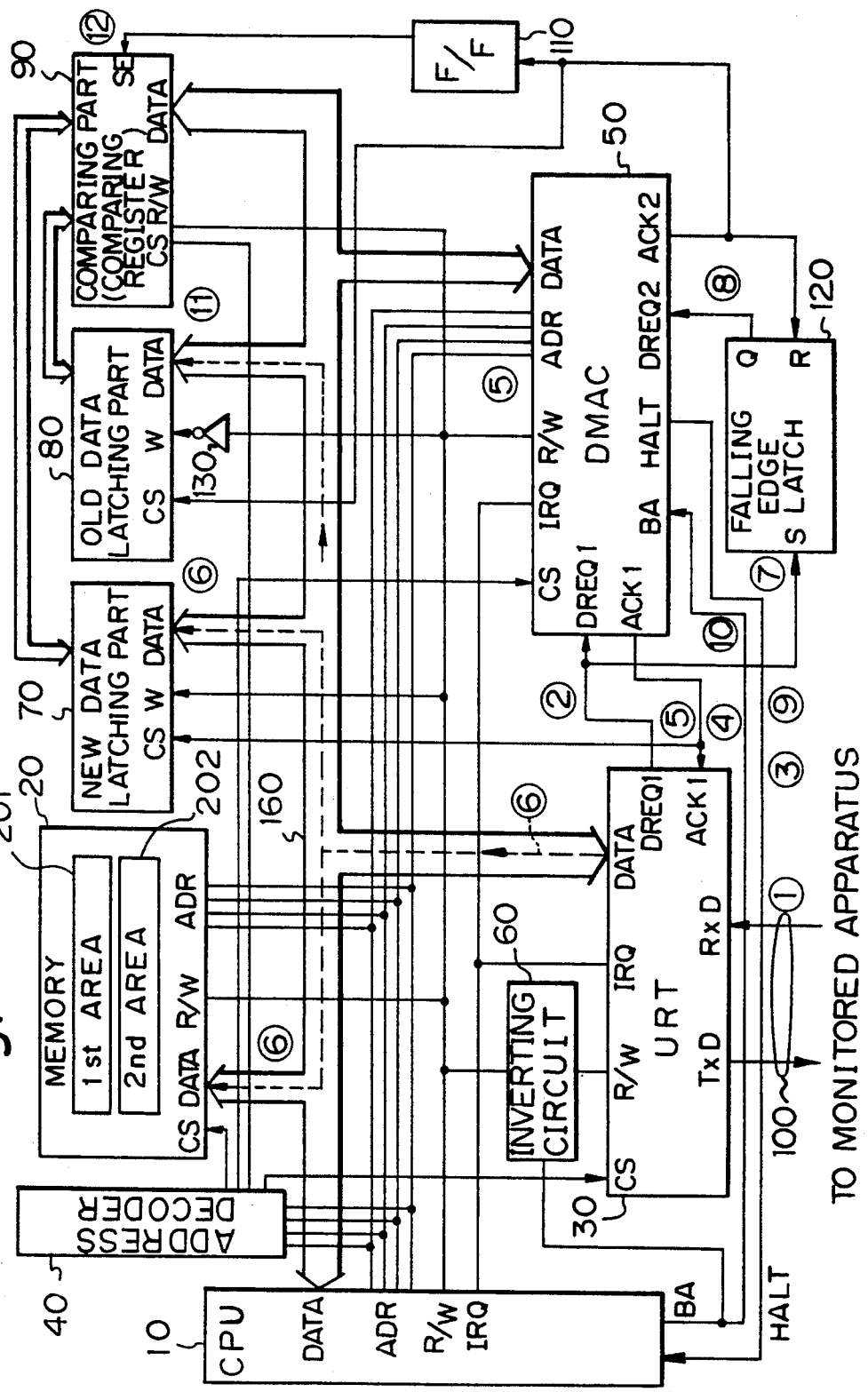

STATUS CHANGE MONITORING APPARATUS

This application is a continuation of application No. 07/683,478, filed Apr. 9, 1991, which is a continuation of application No. 07/457,510 filed Dec. 27, 1989, now abandoned.

BACKGROUND OF THE INVENTION (1) Field of the Invention

The present invention relates to a status change monitoring apparatus, and more particularly, relates to a status change monitoring apparatus by the use of direct memory access control (DMA) for collecting alarm data or status data of an apparatus to be monitored (herein after referred to as a monitored apparatus) such as radio equipment installed in the land stations in, for example, a satellite communication system.

(2) Description of the Related Art

A cross reference related to the present invention is Japanese Patent Publication (Kokai) No. 61-267825 laid open to public on Nov. 27, 1986. This reference discloses a character series searching system which enables a detection of a character series from data stored in an external memory during data transfer by means of DMA.

In general, a monitoring apparatus sends a data request signal to each monitored apparatus, and in response to the data request signal, the monitored apparatus returns data obtained by the monitoring. This communication is known as a polling system.

In a conventional status change monitoring apparatus, all bits of the received data are checked by a software process in a central processing unit to determine whether there is a status change in each bit of the received data. If there is a change, a corresponding lamp is lighted or an indication of the change of status is displayed on a CRT display.

There are, however, problems in the conventional status change monitoring apparatus. First, since the CPU checks all bits of data regardless of whether or not there is a status change, it requires too much software processing time especially when the data length is long or when there are too many monitored apparatus. Second, since the CPU takes care of the display operation for all bits of received data, it also requires too much software processing time so that the response time to display, to light a lamp, to drive a buzzer, and so forth is too long.

SUMMARY OF THE INVENTION

Accordingly, an object of the present invention is to provide a new status change monitoring apparatus in which the monitoring process is carried out first by hardware and then by software whereby the processing time and the response time are shortened.

To attain the above object, there is provided, according to the present invention, a status change monitoring apparatus, connected to an apparatus to be monitored via a serial communication line, for checking data obtained by monitoring the apparatus to be monitored to indicate the result. The status change monitoring apparatus comprises a new data latching unit for latching a transfer unit of new data, an old data latching unit for latching a transfer unit of old data already received in advance of the reception of the new data, a comparing and storing unit connected to the new data latching unit and to the old data latching unit for comparing the transfer unit of new data and the transfer unit of old data and for storing the comparison result, and a processing unit connected to the comparing and storing unit or checking he comparison result to determine whether there is a difference between one frame of the old data and one frame of the new data, where one frame of data consists of a plurality of transfer units. The processing unit processes the new data to indicate the monitoring result only when there is a difference between the old data and the new data.

By the above construction, the comparing and storing unit compares one new frame of data with a previous frame of data unit by unit, and the comparison result is stored therein. At the beginning of the software processing, the central processing unit determines whether or not there is a status change between the new frame of data and the previous frame of data by checking the comparison result. If there is no status change in the comparison result, software processing hereafter is unnecessary. The software processing is carried out only when there is a status change in the comparison result.

In general, most of the data handled in a status change monitoring apparatus are alarm data which do not change with time but only change occasionally.

According to the present invention, before carrying out a software processing of all bits in one frame of data, the central processing unit checks the comparison result so as to determine whether or not there is a difference between the new frame data and the previous frame data, and the software processing is carried out only when there is a status change between the new frame data and the previous frame data. Thus, the processing time can be greatly reduced.

If the detection of the status change is carried out by software only as in the conventional art, the new frame data and the previous frame data are compared bit by bit so that the processing time for each frame is very long.

By contrast, according to the present invention, the above comparison is effected by the comparing and storing unit hardware each time a transfer unit of data is received. The central processing unit only checks the comparison result without effecting the comparing process. Accordingly, the processing time for the comparison and the check of the comparison result can be minimized.

BRIEF DESCRIPTION OF THE DRAWINGS

The above object and features of the present invention will become more apparent from the following description of the preferred embodiments with reference to the accompanying drawings, wherein:

FIG. 6 is a detailed block diagram of the apparatus shown in FIG. 5;

DESCRIPTION OF THE PREFERRED EMBODIMENTS

For better understanding of the present invention, a conventional apparatus and the problems therein will first be described with reference to FIGS. 1 to 4.

Figure 1:
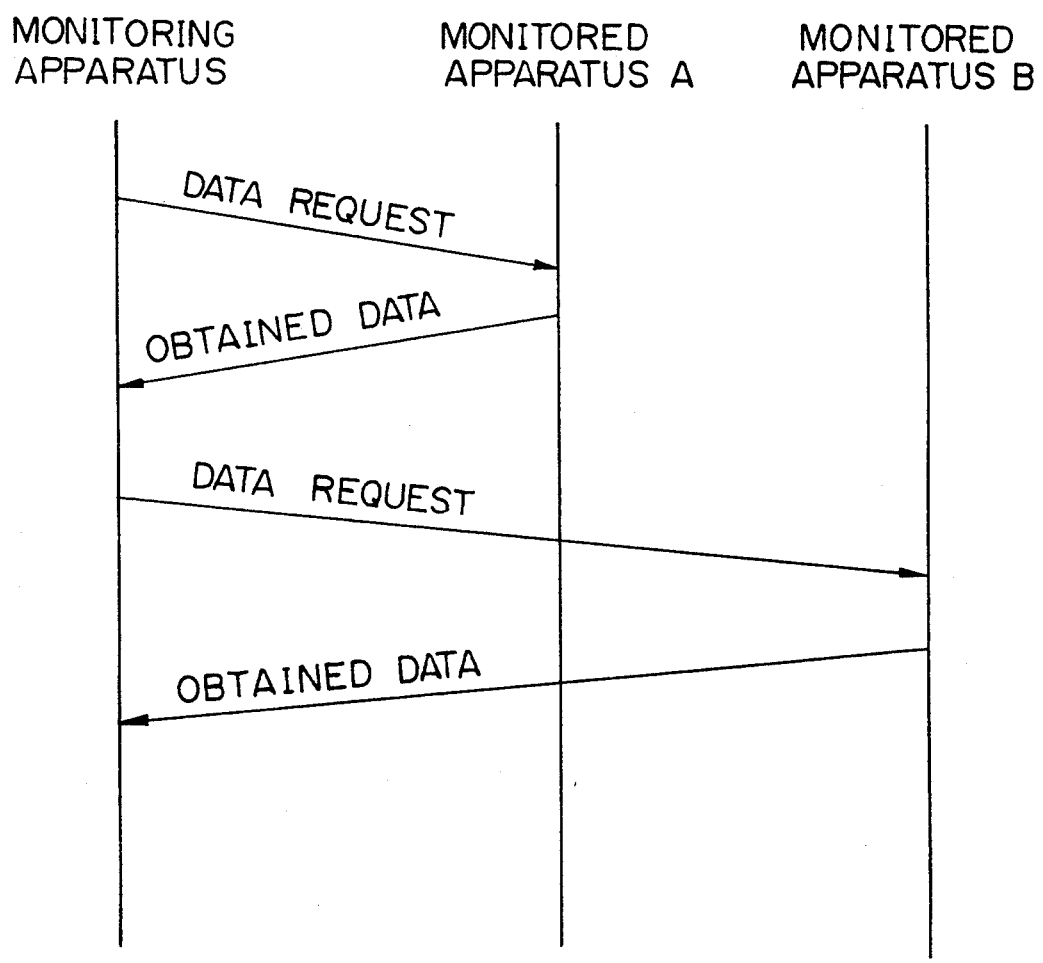
FIG. 1 is a diagram showing a data collecting sequence in a conventional status change monitoring apparatus.

FIG. 1 is a time sequence diagram of the data collecting sequence in a conventional status change monitoring apparatus. In the figure, only two monitored apparatus A and B are shown for the sake of simplicity. In practice, however, there may be a number of monitored apparatus monitored by the monitoring apparatus. From each monitored apparatus, data obtained by monitoring the apparatus are sent to the monitoring apparatus. The transmission of data is usually effected by means of a polling method. Namely, in response to a data request from the monitoring apparatus, the monitored apparatus A or B sends data obtained by monitoring the monitored apparatus.

The data received by the monitoring apparatus are conventionally checked bit by bit by software so as to display the alarm data or status data by lamps, by a CRT display, and so forth.

When the monitoring apparatus centrally collects the data from a great many number of monitored apparatus, the amount of data is also great so that the load on the central processing unit in the monitoring apparatus becomes too large. Further, since the collected data includes numerical data for reporting an output power level, temperature and so forth, the data length of each frame of data becomes as long as 20 bytes to 100 bytes, where one byte is a transfer unit consisting of 8 bits. Such as long data length also causes the load on the central processing unit to be too large.

Conventionally, there are two types of monitoring apparatus, one utilizing an interrupt request signal and the other utilizing a direct memory access control.

Figure 2:
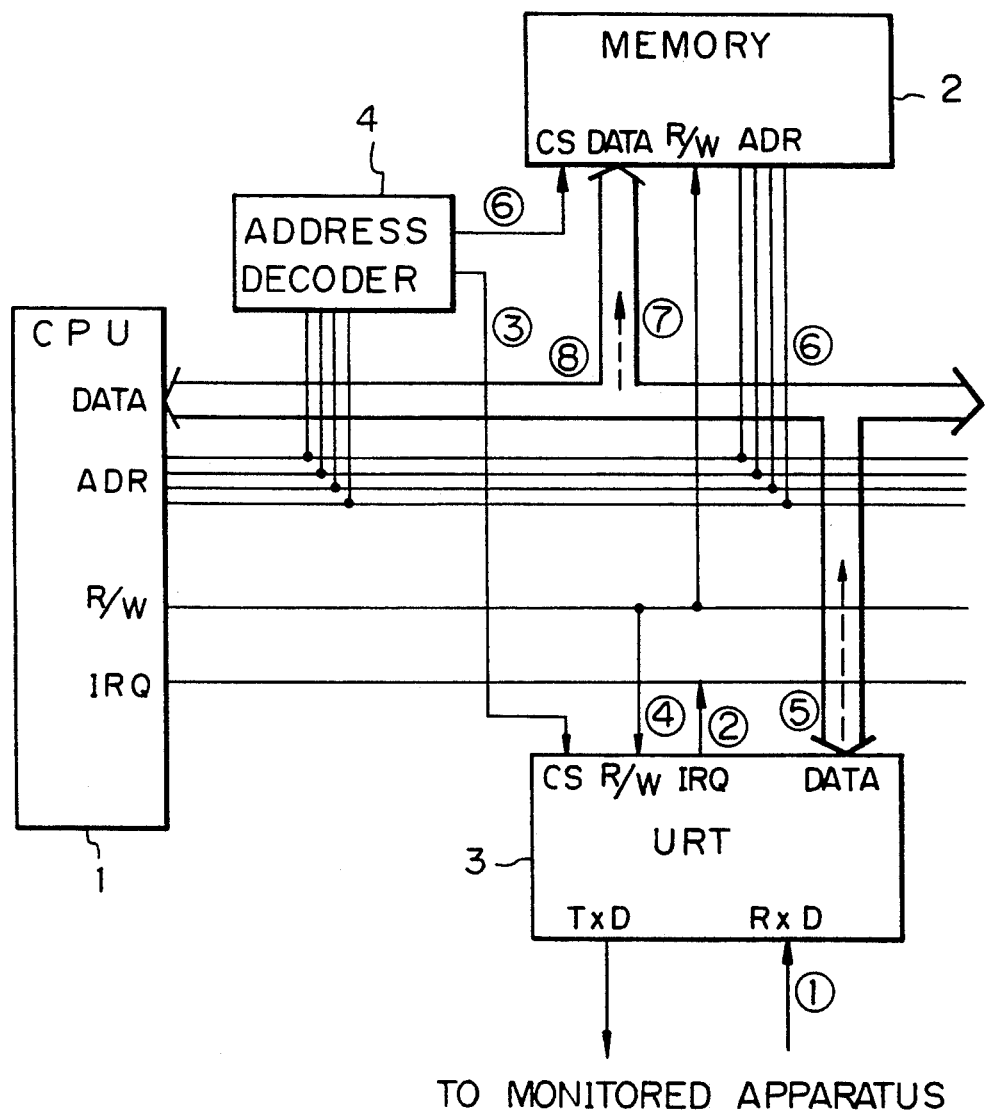
FIG. 2 is a block diagram of a conventional status change monitoring apparatus utilizing an interrupt request system.

FIG. 2 is a block diagram of a conventional status change monitoring apparatus utilizing an interrupt request system. In the figure, 1 is a central processing unit (CPU), 2 is a memory, 3 is a universal receiver/transmitter (URT), and 4 is an address decoder. The URT 3 is connected to a plurality of monitored apparatus via serial communication lines. The URT 3 has a transmission data terminal TxD for transmitting control signals to the monitored apparatus and has a receiving data terminal RxD for receiving data obtained by monitoring the monitored apparatus.

When the data obtained by monitoring is received at the receiving data terminal RxD, the process sequence is illustrated in the figure by circled numerals. Namely, each time the URT receives one byte of data at the receiving data terminal RxD (①), the data is stored in a buffer memory in the URT 3, and, the URT 3 generates an interrupt request signal IRQ (②) which is applied to an interrupt request signal receiving terminal IRQ of the CPU 1. In response to the signal IRQ, the CPU 1 generates an address signal ADR designating the URT 3. The address decoder 4 decodes the address signal to select the URT 3 via a chip select terminal CS (③). Then, the CPU 1 generates a read signal R which is applied to a read/write terminal R/W of the URT 3 (④). In response to the read signal R, the CPU 1 reads the data from the buffer memory of the URT 3 (⑤). Then, the CPU 1 generates an address signal designating the memory 2 (⑥). The address decoder 4 decodes the address signal to select the memory 2 via its chip select signal CS (⑥). The CPU 1 then generates a write signal W (⑦). In response to the write signal W, data stored in the CPU 1 is written into the memory (⑧).

In the above described conventional monitoring system utilizing the IRQ signal, at least eight machine cycles are necessary for the CPU 1 to write one byte of data into the memory 2. During the eight machine cycles, the CPU 1 cannot perform any other operations. This eight machine cycle period for transferring one byte of data into the memory 2 is too large a load for the CPU 1.

Figure 3:
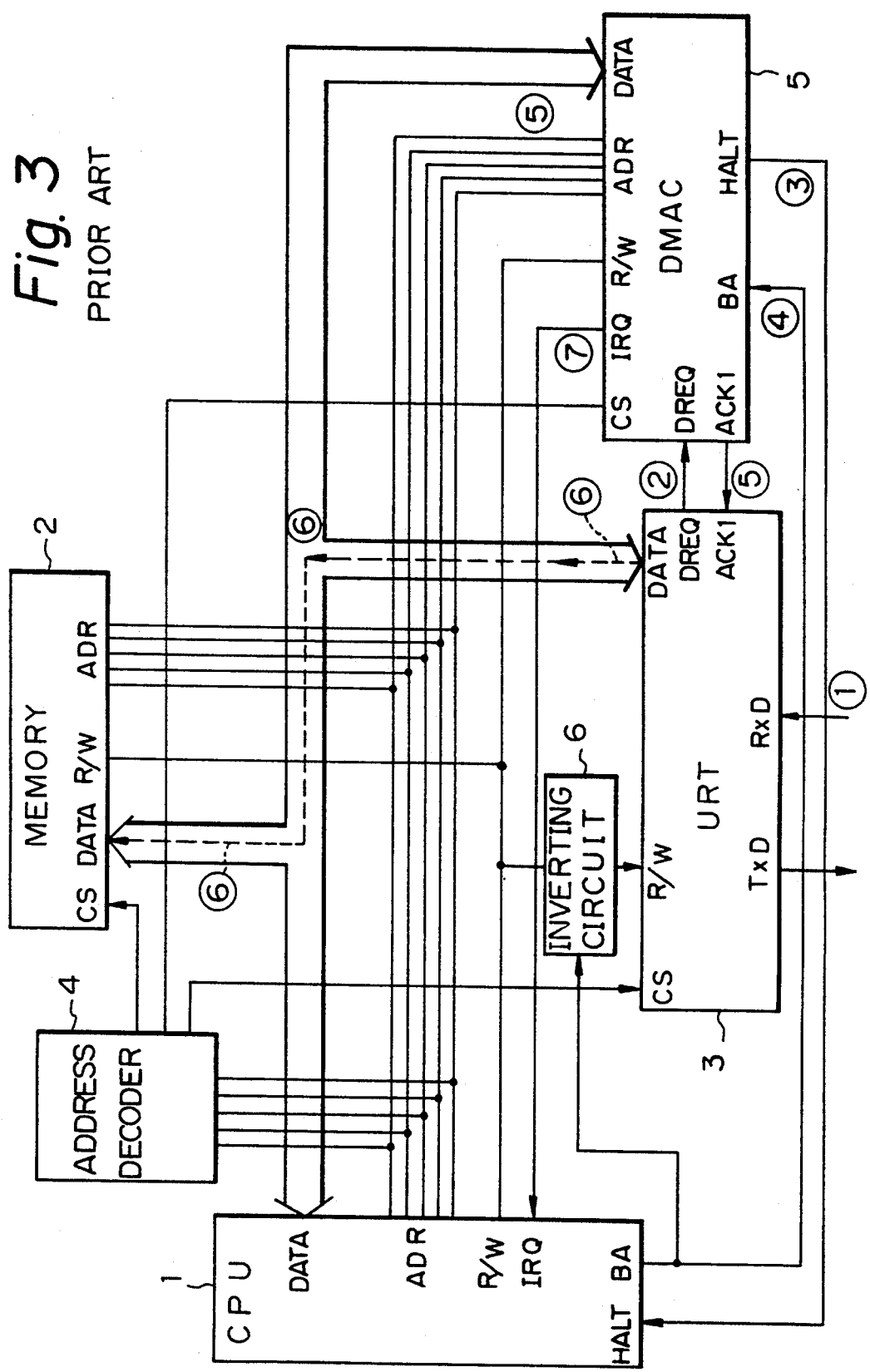
FIG. 3 is a block diagram of a conventional status change monitoring apparatus utilizing a direct memory access control system.

FIG. 3 is a block diagram of a conventional status change monitoring apparatus utilizing a direct memory access control system. In the figure the same reference symbols as used in FIG. 2 represent the same parts, and 5 is a direct memory access controller (DMAC), and 6 is an inverting circuit.

When the data obtained by monitoring is received at the receiving data terminal RxD, the process sequence is also illustrated in the figure by circled numerals. Namely, each time the URT receives one byte of data at the receiving data terminal RxD, the data is stored in a buffer memory in the URT 3 (①), and, the URT 3 generates a data transfer request signal DREQ requesting to transfer the received data by means of direct memory access transfer. To this end, the URT 3 is previously initialized by the CPU 1 for the DMA transfer. The data transfer request signal DREQ is applied to the DMAC 5 (②). In response to the data transfer request signal DREQ, the DMAC 5 generates a halt request signal HALT which is appllied to the CPU 1 (③). In response to the halt request signal HALT, the CPU 1 generates a bus acknowledge signal BA which is applied to the DMAC 5 (④), and the CPU 1 makes the data bus line free to be used by other units. When the DMAC 5 has received the bus available signal BA, it obtains a right to use the data bus line for one machine cycle. Thus, the DMAC 5 generates an address signal ADR and a write signal W which are applied to the memory 2 (⑤). Thus, the data stored in the URT 3 is directly transferred to the memory 2 (⑥) without the control of the CPU 1.

As described above, the data obtained by monitoring the monitored apparatus are transferred byte by byte. When the last byte in one frame (for example 50 bytes) of data is detected by the DMAC 5, it generates an interrupt request signal IRQ which is applied to the CPU 1 (⑦). In response to the interrupt signal IRQ from the DMAC 5, the right to occupy the bus lines is returned to the CPU 1. The CPU 1 then analyzes the one frame of data stored in the memory 2 by means of software processing.

When an 8-bit CPU is used, the above described conventional IRQ system can be used when there is only one pair of communication lines for transmission and receiving, and the communication speed is below 9600 bps. When the line load exceeds this condition, only the DMA control shown in FIG. 3 can be used.

Figure 4:
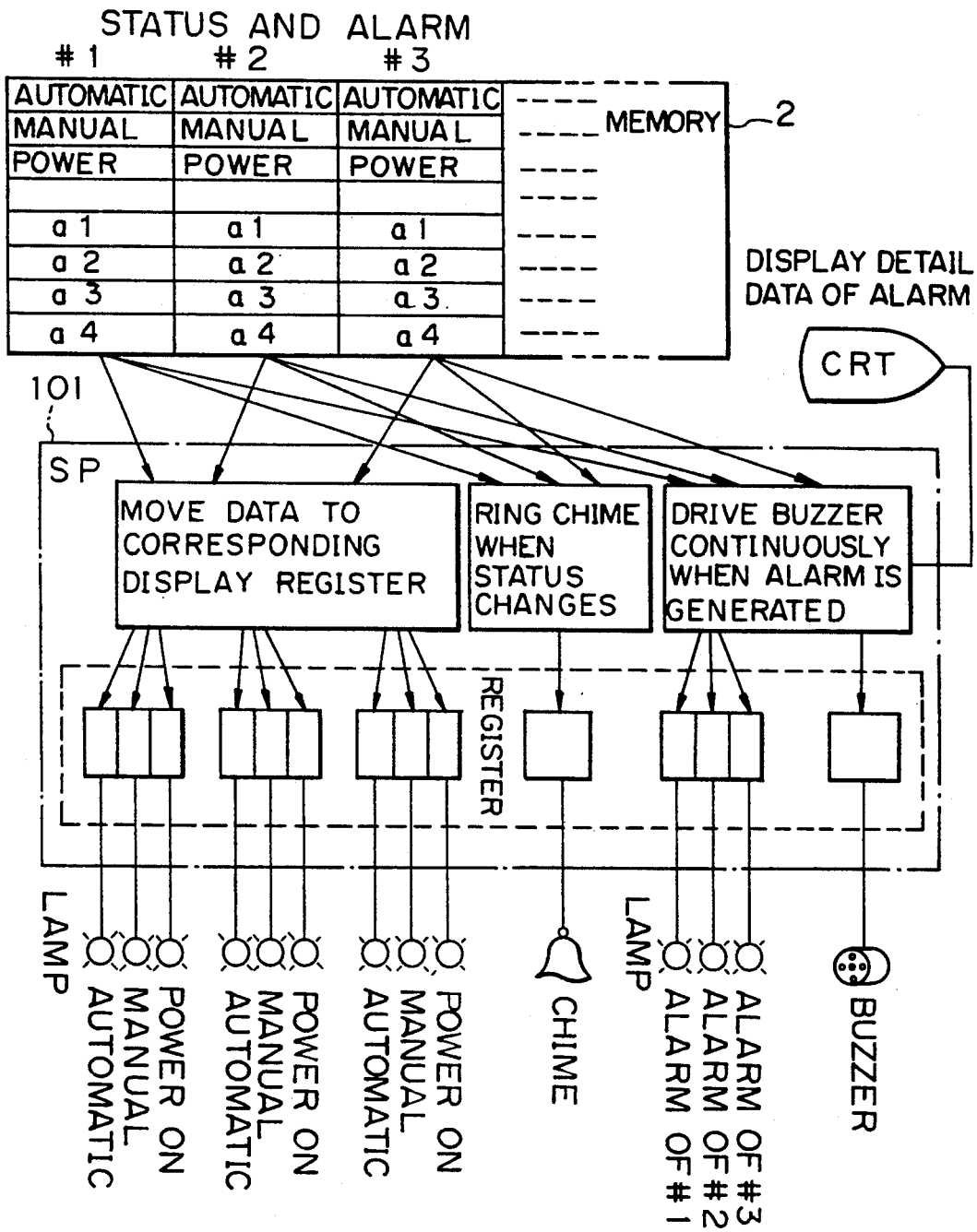
FIG. 4 is a diagram showing the relation between received data and outputs in the conventional status change monitoring apparatus.

FIG. 4 is a diagram showing the relation between received data and outputs in the conventional status change monitoring apparatus shown in FIG. 3.

As shown in the figure, the memory 2 stores the one frame of data received from each monitored apparatus. Therefore, plural frames of data corresponding to plural monitored apparatus #1, #2, #3, . . . are stored in the memory 2.

Each frame of data includes status signals such as an "automatic" signal representing whether or not the corresponding monitored apparatus is being operated automatically, a "manual" signal representing whether or not the corresponding monitored apparatus is being operated manually, a "power" signal representing whether or not the corresponding monitored apparatus is powered, an alarm signals a1, a2, a3 . . .

The CPU 1 has a software processing part (SP) 101 which is operate by software such as programs. Based on the software, the CPU 1 reads the frame of data including the above mentioned status signals and alarm signals byte by byte.

Then, the CPU 1 carries out software processing by reading data from the memory byte by byte, and by comparing a byte of the old data and a byte of the new data bit by bit so as to display the detail data of an alarm, to light a lamp, or to drive an alarm buzzer.

For example, the status signals such as the "automatic" signal and the "manual" signal are moved to a display register in the CPU 1 corresponding to the monitored apparatus, and then the corresponding lamps are turned on or off depending on the status signals. In addition, if there is a change of status between the current frame of data and the previous frame of data, a chime is rung one time for example. Further, if an alarm signal is detected, a buzzer is continuously driven and a corresponding alarm lamp is lighted by the alarm data in the corresponding display register. The detailed data of the alarm is displayed by the CRT.

There are problems in the above described conventional monitoring apparatus utilizing the DMA system. First, when the monitoring apparatus monitors too many apparatus, the processing speed of the CPU becomes insufficient in comparison with the input speed of data into the memory. In other words, during the processing of one frame data by the CPU 1, a number of frames of data may be stored in the memory 2. In such a case, the data stored in the memory 2 has to wait until the CPU 1 processes the one frame of data.

Second, since the CPU processes one frame of data bit by bit regardless of whether or not there is a status change or there is an alarm. This also requires a long processing time.

The above mentioned problems become serious especially when the data length of one frame is long.

Due to the long processing time, the efficiency of the data processing by the CPU is low and it takes a long time to response to a status change to drive the lamps, the buzzers, or the chime, or to display the alarm data on the CRT display.

In the following, embodiments of the present invention are described with reference to FIGS. 5 to 8C.

Figure 5:
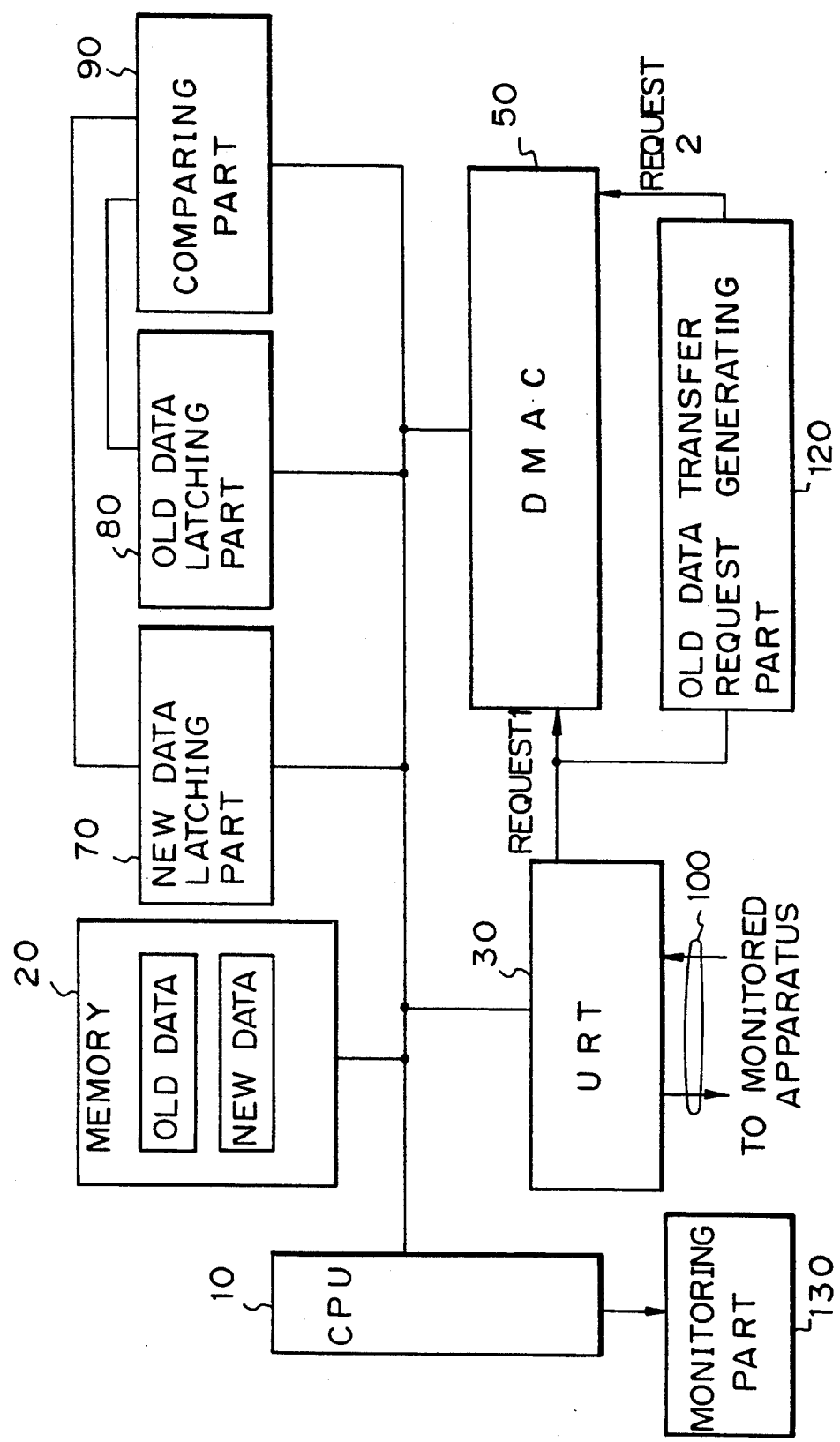
FIG. 5 is a principal block diagram of a status change monitoring apparatus according to an embodiment of the present invention.

FIG. 5 is a block diagram of a status change monitoring apparatus according to an embodiment of the present invention. In the figure, the status change monitoring apparatus includes a central processing unit (CPU) 10, a memory 20, a universal receiver/transmitter (URT) 30, a direct memory access controller (DMAC) 50, a new data latching part 70, an old data latching part 80, a comparing and storing part 90, an old data transfer request generating part 120, and a monitoring part 130. The status change monitoring apparatus is connected to a monitored apparatus (not shown in FIG. 5) via a serial communication line 100 for collecting data obtained by monitoring the monitored apparatus. The central processing unit 10 processes the data obtained by monitoring the monitored apparatus to generate a control signal which is supplied to the monitoring part 130 to display the status of the monitored apparatus or to light a lamp reporting an alarm. The DMAC 50 transfers data by means of direct memory access control.

The memory 20 stores, according to the invention, a frame of new data and a frame of old data obtained by monitoring the monitored apparatus. The frame includes a plurality of transfer units. For example, one frame consists of 50 bytes, and one transfer unit is one byte which consists of 8 bits. The frame of new data and the frame of old data are continuously received by the monitoring apparatus. Namely, the frame of old data is received immediately before receiving the frame of new data. The new data latching unit 70 latches a transfer unit of the new data. The old data latching unit 80 latches a transfer unit of the old data corresponding to the transfer unit of the new data latched in the new data latching unit 70. The comparing and storing unit 90 compares the transfer unit of the old data in the old data latching unit 80 and the transfer unit of the new data in the new data latching unit 70, and stores the comparison result.

The writing operation of each transfer unit of the new data into the memory 20 and the new data latching unit 70 is effected during the first direct memory access cycle period. The writing of each transfer unit of the old data from the memory 20 into the old data latching unit 80 is effected during the second direct memory access cycle period successive to the first direct memory access cycle period. The comparison and storing in the comparing and storing unit 90 are effected during the second direct memory access cycle period. After one frame, for example 50 bytes, of the new data is compared with one frame of the old data by the comparing and storing unit 90, the central processing unit 10 performs a software processing to generate a control signal which is sent to the monitoring part 130 only when a change of status is detected in the comparison result.

By the above construction, the comparing and storing unit 90 compares one frame of data unit by unit, for example byte by byte, with the previous frame of data, and the comparison result is stored therein. At the beginning of the software processing, the central processing unit determines whether or not there is a status change between the new frame of data and the previous frame of data by checking the comparison result. If there is no status change in the comparison result, the software processing thereafter is unnecessary. Therefore, the software processing is carried out only when there is a status change in the comparison result.

In general, most of the data treated in a status change monitoring apparatus are alarm data which do not changed with time but only change occasionally.

According to the present invention, before carrying out a software processing of all bits in one frame of data, the central processing unit checks the comparison result to determine whether or not there is a difference between the new frame data and the previous frame data, and the software processing is carried out only when there is a status change between the new frame data and the previous frame data. Thus, the processing time can be greatly reduced.

If the detection of the status change is carried out by software only, the new frame data and the previous frame data are read byte by byte and are compared bit by bit by software so that the processing time for each frame is very long.

By contrast, according to the present invention, the above comparison is effected in hardware by the comparing and storing unit 90 by the use of the direct memory access control each time a transfer unit of data is received. The central processing unit 10 only checks the comparison result without effecting the comparing process. Accordingly, the processing time for the comparison and the check of the comparison result can be made minimized.

FIG. 6 is a detailed block diagram of the status change monitoring apparatus shown in FIG. 5. In FIGS. 5 and 6, the same reference numerals represent the same parts. In addition to the parts shown in FIG. 5, the apparatus further includes an address decoder 40 for decoding address signals generated from the CPU 10 or from the DMAC 50, an inverting circuit 60 for inverting a read/write signal generated from the CPU 10 or from the DMAC 50, a flip flop 110, a falling edge latching circuit 120, and a NOT gate 130.

The memory 20 has a first area 201 and a second area 200. Each frame of new data is stored alternately in the first area 201 or in the second area 202. Namely, when the first frame of data is already stored in the first area 201, the second frame of new data will be stored in the second area 202; the third frame of new data will be stored in the first area; and so forth.

The new data latching part 70 and the old data latching part 80 each have a memory capacity of one byte.

The operation of the apparatus shown in FIG. 6 when one frame of data is received is described in the following.

First, before receiving data, the URT 30 is initialized by the CPU 10 so that the format and the speed of the transmitting and receiving data are initialized. This initialization is effected by applying a chip select signal CS to the URT 30, by providing an appropriate address signal from the CPU 10 to the address decoder 40, by applying a write signal W to the URT 30, and by writing initialization data from the CPU 10 through a data bus 160 into the URT 30.

Then, the DMAC 50 is initialized by the CPU 10 by supplying a chip select signal CS, a write signal W, and appropriate data. The DMAC 50 has a first channel and a second channel as later described in more detail with reference to FIGS. 7A to 7C. The first channel and the second channel respectively include a first address counter and a second address counter for designating the addresses in the first area and the second area of the memory 20. In the initialization, the first counter is initialized to have an address specifying the head address in the first area 201 of the memory 20, and the second counter is initialized to have an address specifying the head address of the second area 202.

After the above described initialization is completed, the reception of monitored data starts.

When the URT 30 receives, at its data receiving terminal RxD, a transfer unit (one byte) of data from a monitored apparatus (not shown) ((1)), the URT 30 generates a first data transfer request signal DREQ1 which is supplied to the DMAC 50 ((2)). The signal DREQ1 indicates a request for direct memory access transfer to the DMAC 50 by the use of the first channel including the first address counter.

In response to the signal DREQ1, the DMAC 50 generates a halt signal HALT which is supplied to the CPU 10 ((3)). The CPU 10 generates, in response to the halt signal HALT, a bus available signal BA which is supplied to the DMAC 50 ((4)). After the DMAC 50 receives the signal BA, it can use the data bus 160 for one machine cycle period. The DMAC 50 returns a first acknowledge signal ACK1 to the URT 30 ((5)), and after the URT 30 receives the first acknowledge signal ACK1, it can transfer data by means of the DMA. During the one direct memory access control cycle period, the first counter in the the DMAC 50 generates an address signal ADR specifying an address in the first area 201 of the memory 20 to which the new data is to be written. The generated address signal ADR is directly supplied to the memory 20 so as to specify the first area 201 for storing new data. The generated address is also supplied to the address decoder 40 and decoded thereby so that the memory 20 is selected by the chip select signal CS. Then, also during the one direct memory access control cycle period, the DMAC 50 generates a write signal W which is applied to both the memory 20 and the new data latching part 70. The write signal W is inverted by the inverting circuit 60 to generate a read signal R which is applied to the URT 30. In response to the read signal R, the one received byte of the new data received by the URT 30 is read therefrom and transferred through the data bus 160 to both the memory 20 and the new data latching part 70. Thus, the one byte of the new data is stored in the first area 201 of the memory 20 and in the new data latching part 70 ((6)). The subsequent bytes of data are also stored in the first area 201 of the memory 20 and in the new data latching part 70. In this way, one frame of new data is stored in the first area 201 of the memory 20.

The next frame of new data is stored in the second area 202 by initializing the first address counter to have the head address of the second area. At this time, the previous frame of data already stored in the first area 201 becomes an old frame of data.

The third frame of new data is stored in the first area 201 by initializing the first address counter to have the head address of the first area 201. At this time, the data already stored in the second area 202 becomes an old data.

In this a way, successive frames of new data are alternately stored in the first area 201 and the second area 202.

It is assumed that, when the first one byte of new data is transferred to the first area 201 and to the new data latching part 70, one frame of old data, i.e., the previous data, has already been stored in the second area 202 of the memory 20.

When the data transfer of the one byte of the new data from the URT 30 to the first area 201 and to the new data latching part 70 is finished, the first single machine cycle period ends and the first data transfer request signal DREQ1 is returned to the low level (L)((7)).

In response to tho falling edge of the first data transfer request signal DREQ1, the falling edge latching circuit 120 is set to generate a second data transfer request signal DREQ2 which continues during the second single machine cycle period ((8)).

In response to the second data transfer request signal DREQ2, the DMAC 50 again generates the halt signal HALT which is applied to the CPU 10 (⑨). The CPU 10 returns the bus available signal BA to the DMAC 50 ( 10 ). The DMAC 50 returns a second acknowledge signal ACK2 to the falling edge latching circuit 120 so as to reset it. The second acknowledge signal ACK2 continues for a second direct memory access control cycle period. The second acknowledge signal ACK2 is supplied as a chip select signal CS to the old data latching part 80. During the second one machine cycle period, the second counter in the the DMAC 50 generates an address signal ADR for specifying an address in the second area 202 of the memory 20. The specified address in the second area 202 corresponds to the address in the first area 201 specified during the first single machine cycle period. Namely, when the head address of the first area 201 is specified in the first period. The head address of the second area 202 is also specified in the second period; when the second address of the first area 201 is specified in the first period, the second address of the second period is also specified in the second period; and so forth. The generated address signal ADR is directly supplied to the memory 20 so as to specify the address in the second area 202. The generated address is also supplied to the address decoder 40 and decoded thereby so that the memory 20 is selected by the chip select signal CS. Then, also during the second direct memory access control cycle period, the DMAC 50 generates a read signal R which is applied to the memory 20. The read signal R is inverted by the inverter 130 so that a write signal W is applied to the old data latching part 80. The read signal R is also inverted by the inverting circuit 60 so that a write signal W is applied to the URT 30. Thus, one byte of the old data is read from the second area 202 and is written into the old data latching part 80 ( ⑪ ). During this period when the read signal R is generated from the DMAC 50, the URT 30 can store another byte of new data.

The second acknowledge signal ACK2 is delayed by one clock signal period by the flip flop 110. Therefore, after completion of the data transfer from the second area 202 to the old data latching part 80, one byte of the new data in the new data latching part 70 and one byte of the old data in the old data latching part 80 are latched in the comparing part 90 in response to the delayed second acknowledge signal output from the flipflop 110.

In the comparing part 90, the one byte of the the new data and the corresponding one byte of the old data are compared, and the comparison result is stored therein.

As described above, one frame of old data and one frame of new data are compared byte by byte. After one frame of comparison is finished, the CPU 10 generates an address signal for specifying the comparing and storing part 90 so that the address decoder 40 selects it by its chip select signal CS. Then, the CPU 10 generates a read signal R which is applied to the comparing and storing part 90. Thus, the data of the comparison results of one frame of data are transferred from the comparing and storing part 90 to the CPU 10.

The CPU 10 then analyzes the comparison result by a software processing to check whether or not there is a difference between the one frame of the old data and the one frame of the new data. Only when there is a difference dose the CPU 10 generate an alarm signal by a software processing to a display or to drive a lamp or buzzer. If there is no difference, the CPU 10 need not drive the CRT, lamps or buzzer.

Figure 7A:
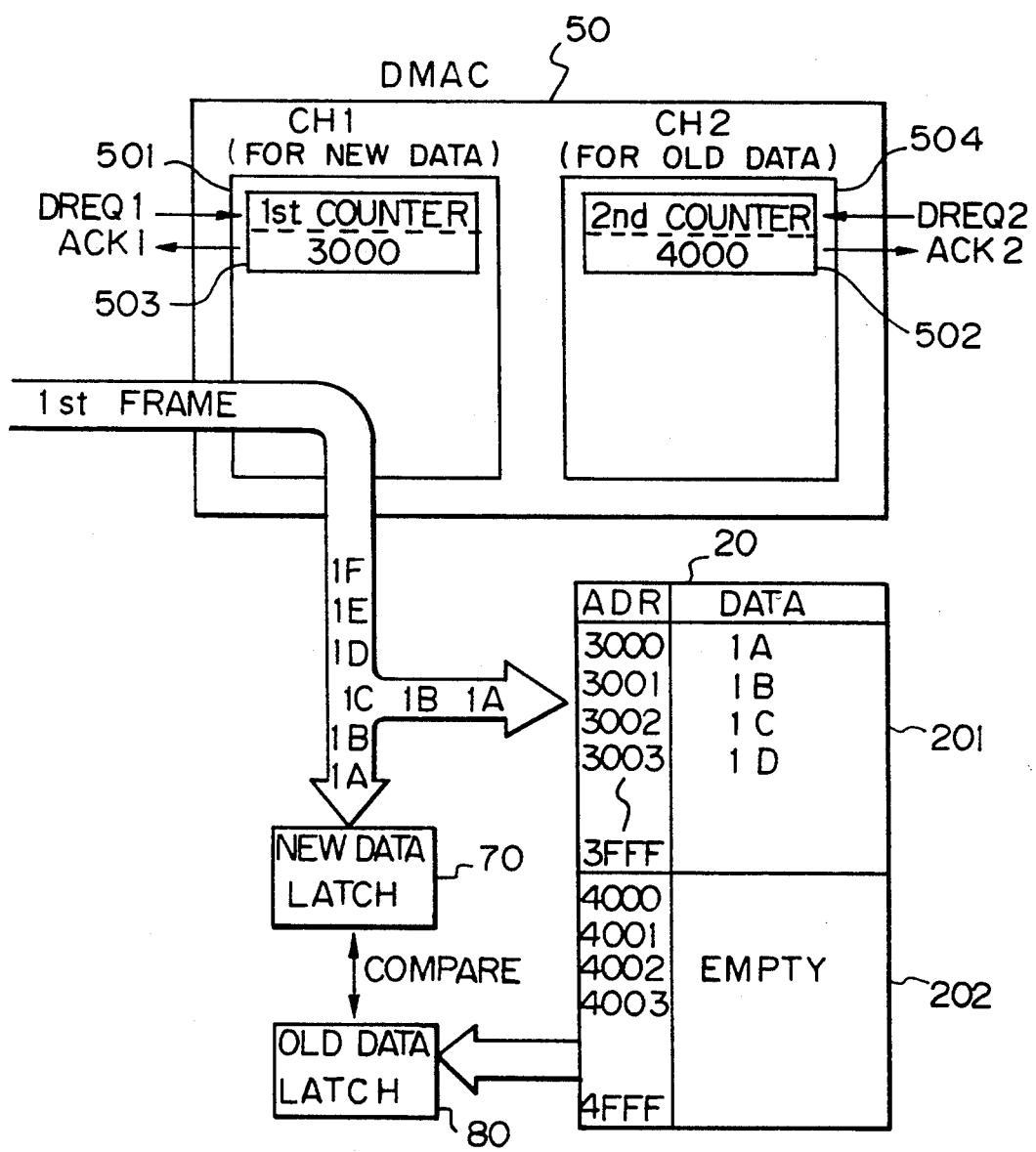
FIGS. 7A to 7C are block diagrams for explaining the transfer of address counters in a direct memory access controller and for explaining the sequence of writing data into the memory.
Figure 7B:
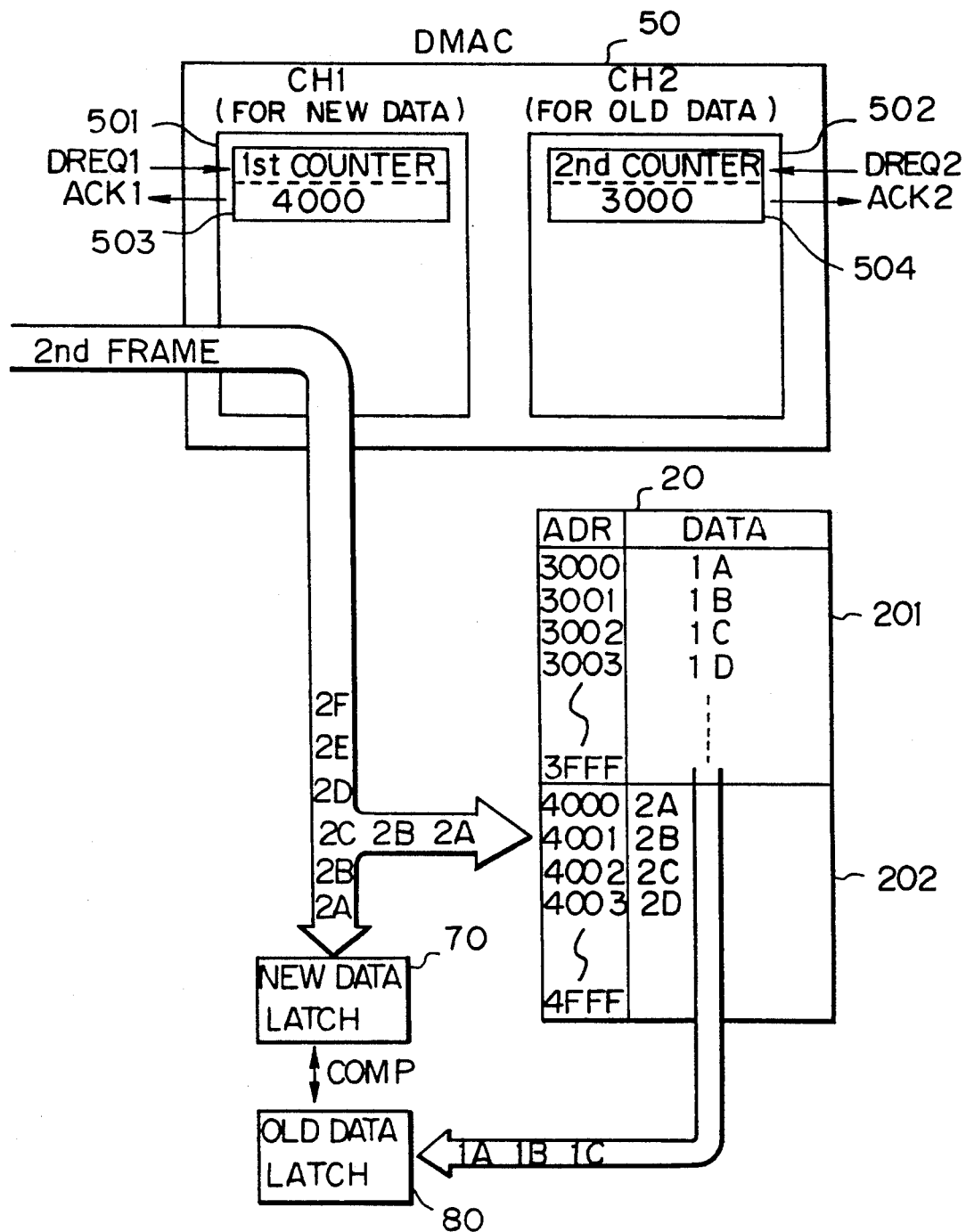
Figure 7C:
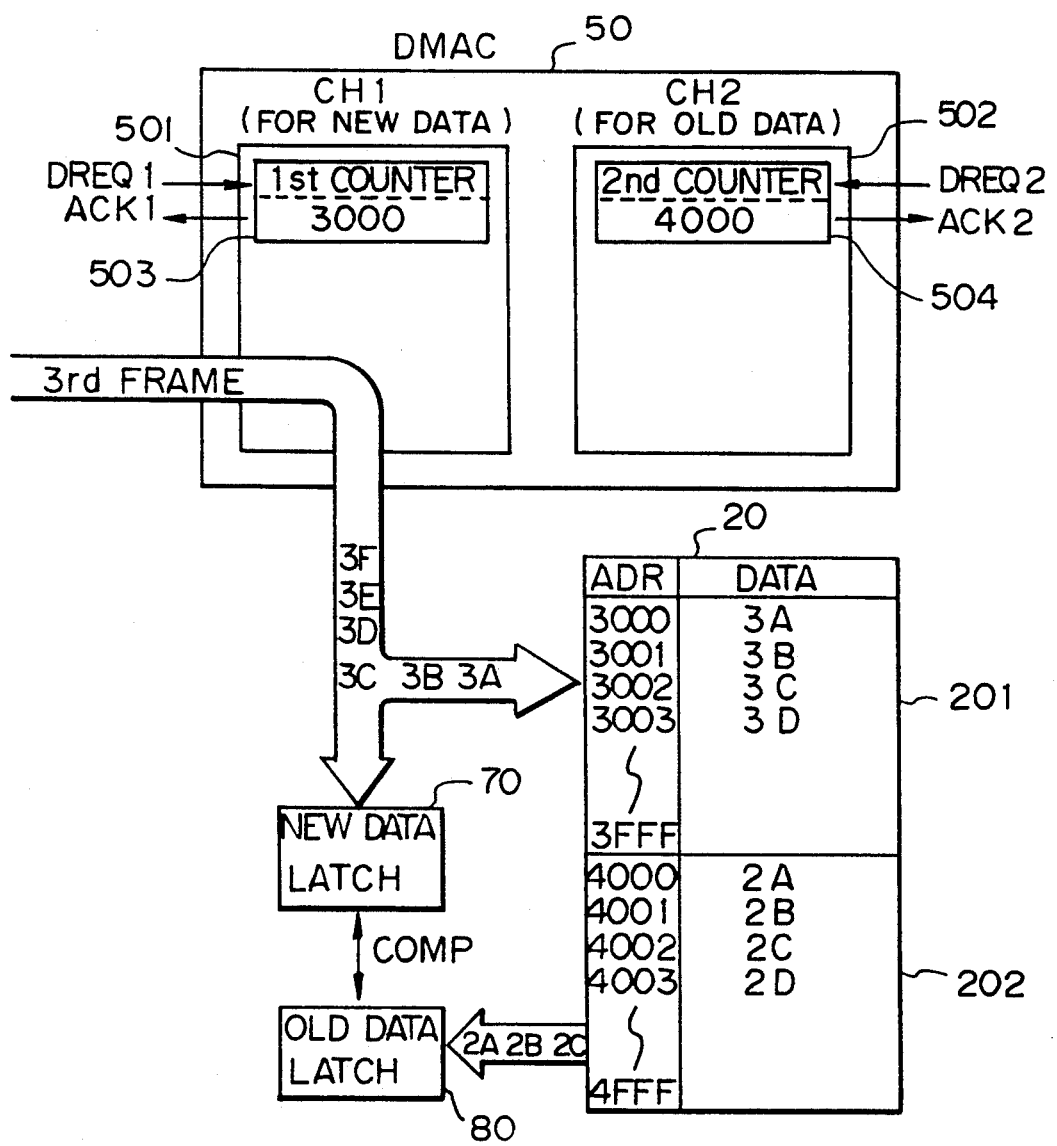

FIGS. 7A to 7C are diagrams for explaining the first and the second address counters in the DMAC 50 and the data write in sequence into the memory 20. In the figures, FIG. 7A shows the case when the first frame of data is receives; FIG. 7B shows the case when the second frame of data is received; and FIG. 7C shows the case when the third frame of data is received.

As shown in FIG. 7A, the DMAC 50 includes a first channel (CH1) 501 and a second channel (CH2) 502. The first channel (CH1) 501 is for receiving the first data transfer request signal DREQ1 and for sending the first acknowledge signal ACK1. The second channel (CH2) 502 is for receiving the second data transfer request signal DREQ2 and for sending the second acknowledge signal ACK2. The first channel (CH) 501 includes the first address counter 503 for specifying addresses of new data to be written into the memory. The second channel (CH2) 502 includes the second address counter 504 for specifying addresses of old data to be read from the memory 20. In the initial state before receiving the first frame of data, the first address counter 503 is initialized to have a count value of 3000 for example, which is the head address of the first area 201 in the memory 20; and the second counter is initialized to have a count value of 4000 for example, which is the head address of the second area 202 in the memory 20. The first area 201 has addresses from 3000 to 3FFF; and the second area 202 has addresses from 4000 to 4FFF. as an example. When the first frame of data 1A, 1B, 1C, 1D, . . . are received byte by byte, the first address counter 503 counts up from 3000, 3001, 3002, 3003, . . . so that the data are stored in the first area 201. Simultaneously with the storing of each byte into the first area 201, the same bytes of data are also latched in the new data latching part 70. From the second area 202, each byte of old data is latched in the old data latching part 80. If no data has been received before receiving the first frame of data, the second area 202 is empty. In this case, the new data and the old data do not coincide for almost all bytes. Accordingly, the CPU 10 reads the first frame of data stored in the memory 20 to effect necessary software processings in the same way as in the conventional apparatus. Alteratively, by recognizing that the received data is the first frame data so that the second area is empty, the CPU 10 can omit the software processing of the first frame of data.

FIG. 7B shows the case when the second frame of data is received after the first frame of data 1A, 1B, 1C, 1D, . . . have been stored in the first area 201. Before receiving the second frame of data, the first address counter 503 is initialized to have a count value of 4000 which is the head address of the second area 202; and the second address counter 504 is initialized to have a count value of 3000 which is the head address of the first area 201. Then the second frame of new data 2A, 2B, 2C, 2D, . . . is stored in the second area 202. The data 1A, 1B, 1C, 1D, . . . already store in the first area 201 is the old data. The CPU 10 needs to perform the software processing only when there is a difference between any one of the bytes of the new data 2A, 2B, 2C, 2D, . . . and the corresponding one of the old data 1A, 1B, 1C, 1D, . . . If there is no difference, the software processing is not necessary.

FIG. 7C shows the case when the third frame of data is received after the second frame of data 2A, 2B, 2C, 2D, . . . has been stored in the second area 202. Before receiving the second frame of data, the first address counter 503 is initialized to have a count value of 3000 which is the head address of the first area 201; and the second address counter 504 is initialized to have a count value of 4000 which is the head address of the second area 202. Then the third frame of new data 3A, 3B 3C, 3D, ... is stored in the first area 201. The data 2A, 2B, 2C, 2D, ... already stored in the second area 202 is the old data. The CPU 10 needs to perform the software processing only when there is a difference between any one of the bytes of the new data 3A, 3B, 3C, 3D, ... and the corresponding one of the old data 2A, 2B, 2C, 2D, ... If there is no difference, the software processing is not necessary.

Figure 8:
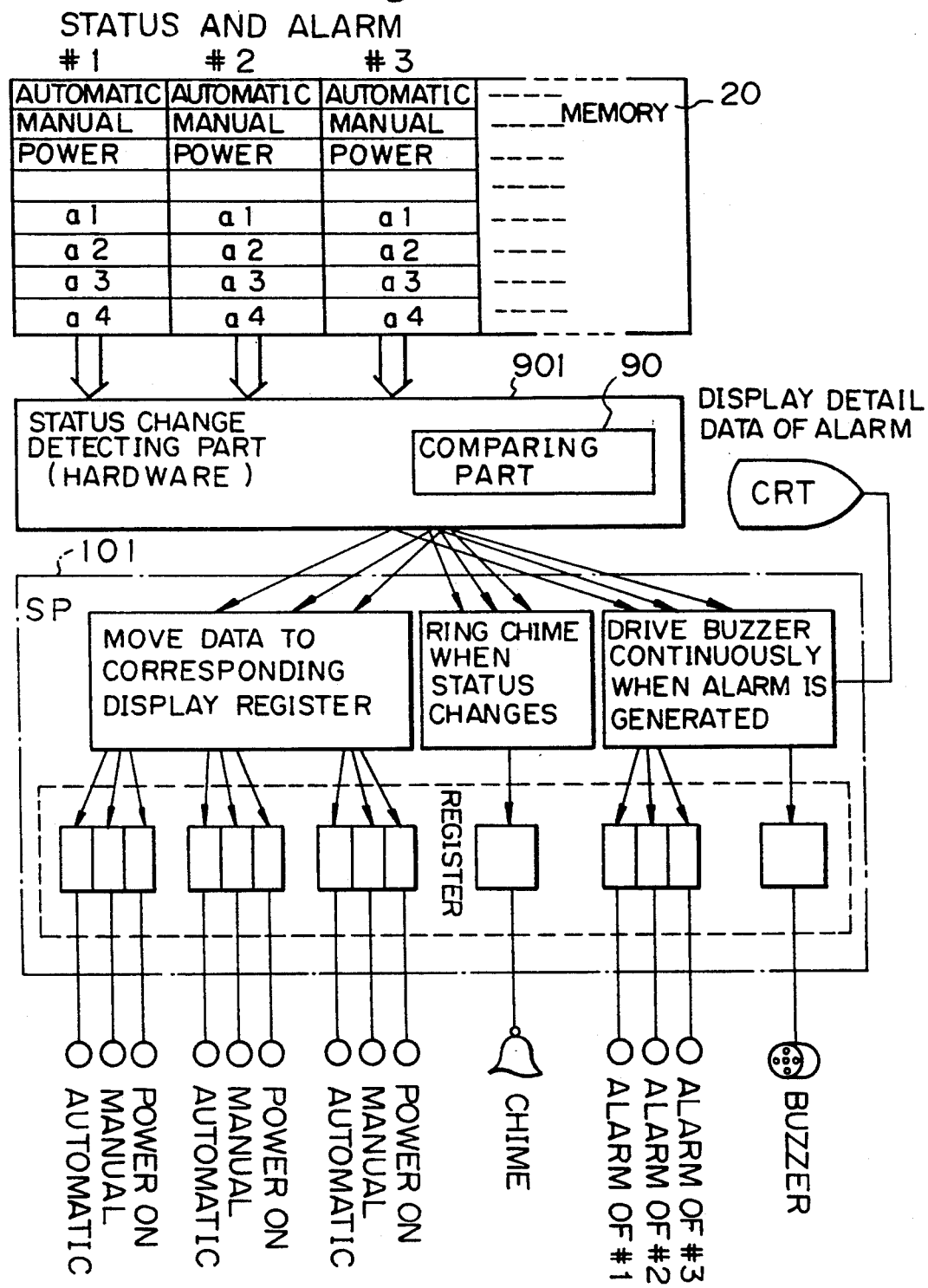
FIG. 8 is a diagram showing the relation between received data and outputs in the status change monitoring apparatus shown in FIG. 6.

FIG. 8 is a diagram showing the relation between received data and outputs in the status change monitoring apparatus shown in FIG. 6.

As shown in the figure, the memory 20 stores one frame of new data and one frame of old data received from each monitored apparatus. Therefore, plural frames of new and old data corresponding to plural monitored apparatus #1, #2, #3, ... are stored in the memory 2.

Each frame of data includes status signals such as an "automatic" signal representing whether or not the corresponding monitored apparatus is operating automatically, a "manual" signal representing whether or not the corresponding monitored apparatus is operating manually, a "power" signal representing whether or not the corresponding monitored apparatus is powered, and alarm signals a1, a2, a3, ...

For hardware, a status change detecting part 901 including the comparing part 90 is provided. The status change detecting part 901 further includes the DMAC 50, the new data latching part 70, the old data latching part 80, the flip flop 110, and the falling edge latching circuit 120 shown in FIG. 6.

The data stored in the memory 20 is processed by the status change detecting part 901 as described with reference to FIGS. 6 and 7A to 7C, so that the comparison results are stored in the comparing part 90.

The CPU 10 has the software processing part (SP) 101 which is the same as that shown in FIG. 4. Based on the software, the CPU 1 reads the comparison results to check whether there is a change between the new data and the old data as described before. Only when there is a change, dose the software processing part 101 process all the bytes of the new data bit by bit in the same way as in the conventional software processing so as to display the detailed data of an alarm, to light a lamp, or to drive a buzzer reporting an alarm.

For example, the status signals such as the "automatic" signal and the "manual" signal are moved to a display register in the CPU 10 corresponding to the monitored apparatus, and then the corresponding lamps are turned on or off depending on the status signals. In addition, if there is a change of status between the current frame of data and the previous frame of data, a chime is rung one time for example. Further, if an alarm signal is detected, a buzzer is continuously driven and corresponding alarm lamp is lighted by the alarm data in the corresponding display register. The detailed data of the alarm is displayed by the CRT.

The software processing according to the above described embodiment only requires a very short amount of time in comparison with the conventional software processing.

Namely, in the conventional software processing, the initialization of the channel in the DMAC 5 takes 0.06 milliseconds (ms); the data transfer of one frame of for example 40 bytes takes 0.04 ms; the data reading of one byte from the memory 2 to the CPU 1 takes 0.015 so that reading 40 bytes takes 0.6 ms; thus the total time amounts to 0.7 ms.

By contrast, according to the embodiment of the present invention in which the above described hardware processing is employed to compare the old data and the new data, the software processing requires an initialization time of the first channel in the DMAC 50 of 0.06 ms; an initialization time of the second channel in the DMAC 50 of 0.06 ms; a data transfer time of the new data of 40 bytes for example of 0.04 ms; the data transfer time of the old data of 0.04 ms; and the checking time of the comparison part 90 of 0.03 ms; thus the total time amounts to only 0.23 ms which is very short in comparison with the conventional software processing time of 0.7 ms. Therefore, according to the embodiment of the present invention, the status change detecting process can be carried out very fast.

According to another embodiment of the present invention, instead of reading all of the one frame data from the memory 20 to the CPU 10 when there is a difference between the old data and the new data, only one byte data corresponding to the difference may be read from the memory to the CPU 10. In this case, the load on the CPU 20 is further reduced in comparison with the case when one frame is read. This can be realized by providing means for identifying the address of the byte of the new data which is different from the corresponding old data byte.

From the foregoing description, it will be apparent that, according to the present invention, since the status change is detected and stored in the hardware, and since the CPU need only check the stored result, the software processing can be effected in almost ⅓ time in comparison with the conventional software processing time. Further, when the new frame data is the same as the old frame data, the software processing is not effected. As a result, the response time to drive the lamps, the buzzers, the chimes, or the CRT display can be greatly improved.

What is claimed is:

1. A status change monitoring apparatus, connected to an apparatus to be monitored via a serial communication line, for checking data obtained by monitoring said apparatus to be monitored to indicate a monitoring result, said status change monitoring apparatus comprising:

a data receiving and transmitting circuit, operatively connected via said serial communication line to said apparatus to be monitored, for receiving data one transfer unit at a time from said apparatus to be monitored;

a new data latching circuit, operatively connected to said data receiving and transmitting circuit, for latching one transfer unit of new data;

an old data latching circuit for latching one transfer of old data, said old data being received before reception of said new data;

a comparing and storing circuit, operatively connected to said new data latching circuit and to said old data latching circuit, for comparing said new data in said new data latching circuit and said old data in said old data latching circuit, and for storing a comparison result;

processing means, separate from and operatively connected to said comparing and storing circuit, for checking said comparison result to determine whether there is a difference between said old data and said new data, said processing means executing software for processing said new data to indicate the monitoring result only when there is a difference in said comparison result produced by said comparing and storing circuit;

a memory, operatively connected to said processing means and to said data receiving and transmitting circuit, for storing a frame of new data and a frame of old data, each frame consisting of a plurality of transfer units; and a direct memory access controller, operatively connected to said new data latching circuit, said old data latching circuit, to said processing means, said data receiving and transmitting circuit and said memory, for controlling data transfer from said data receiving and transmitting circuit to said memory and said new data latching circuit, from said memory to said old data latching circuit, and from said new data latching circuit and said old data latching circuit to said comparing and storing circuit, by direct memory access control, the data transfer from said data receiving and transferring circuit to said memory and to said new data latching circuit being effected transfer unit by transfer unit under control of said direct memory access controller.

2. A status change monitoring apparatus as claimed in claim 1, wherein the data transfer from said data receiving and transmitting circuit to said memory and said new data latching circuit is effected simultaneously for each transfer unit during one direct memory access control cycle period, and the data transfer rom said memory to said old data latching circuit and the comparing in said comparing and storing circuit are effected during another one direct memory access control cycle period.

3. A status change monitoring apparatus as claimed in claim 2, wherein said memory has a first area for storing a first frame of data and a second area for storing a second frame of data, said first area and said second area alternately storing one frame of new data.

4. A status change monitoring apparatus as claimed in claim 3, wherein said direct memory access controller comprises:

a first address counter for counting, when a first frame of new data is being received, the addresses of said first area as the first frame of new data is written, and a second address counter for counting the addresses of said second area as a first frame of old data is read, said first address counter counting the addresses of said second area as a second frame of new data is received subsequent to the first frame of new data, while said second address counter counts the addresses of said first area as the first frame of new data is read as a second frame of old data.

5. A status change monitoring apparatus as claimed in claim 4, wherein, before receiving each one frame of new data, said processing means initializes said first address counter to specify a head address of one of said first and second areas and initializes said second address counter to specify a head address of the other of said first and second areas.

6. A status change monitoring apparatus as claimed in claim 5, wherein when said data receiving and transmitting circuit receives one transfer unit of new data, said data receiving said transmitting circuit generates a first data transfer request signal for a first single direct memory access control cycle period, and wherein said direct memory access controller controls, in response to said data transfer request signal, the transfer of said one transfer unit of data from said data receiving and transmitting circuit to both said memory and to said new data latching circuit.

7. A status change monitoring apparatus as claimed in claim 6, further comprising a data transfer request signal generating means for generating, in response to completion of the first data transfer request signal, a second data transfer request signal in a second single direct memory access control cycle period subsequent to the first data transfer request signal, and wherein said direct memory access controller controls, in response to said second data transfer request signal, the data transfer of one transfer unit of old data from said memory to said old data latching circuit, the data transfer of one transfer of new data from said new data latching circuit to said comparing and storing circuit, and the data transfer of one transfer unit of old data from said old data latching circuit to said comparing and storing circuit.

8. A status change monitoring apparatus as claimed in claim 7, wherein after one frame of data is compared and stored in said comparing and storing circuit, said processing means checks the comparison result in said comparing and storing circuit to determine whether there is a change between said one frame of new data and said one frame of old data, and only when there is a change, said processing means processes said one frame of new data to indicate the monitoring result of said apparatus to be monitored.

9. A status change monitoring apparatus, connected to an apparatus to be monitored via a serial communication line, for checking data obtained by monitoring said apparatus to be monitored to indicate a monitoring result, said status change monitoring apparatus comprising:

data receiving and transmitting circuit, operatively connected via the serial communication line to the apparatus to be monitored, for receiving data one transfer unit at a time from said apparatus to be monitored via the serial communication line and for generating a first data transfer request signal for a first single direct memory access control cycle period when one transfer unit of new data is received by said data receiving and transmitting circuit;

data transfer request signal generating means for generating, in response to completion of the first data transfer request signal, a second data transfer request signal in a second single direct memory access control cycle period immediately following the first data transfer request signal;

new data latching circuit for latching a transfer unit of new data;

old data latching circuit for latching a transfer unit of old data;

a comparing and storing circuit, operatively connected to said new data latching circuit and to said old data latching circuit, for comparing the transfer unit of new data in said new data latching circuit and the transfer unit of old data in said old data latching circuit, and for storing a comparison result;

a memory, operatively connected to said data receiving and transmitting circuit and said old data latching circuit, having a first area and a second area for storing a frame of new data and a frame of old data, the first area and the second area alternately storing one frame of new data, each frame consisting of a plurality of transfer units;

a direct memory access controller, operatively connected to said new data latching circuit, said old data latching circuit, said data receiving and transmitting circuit and said memory, for effecting data transfer of one transfer unit of data from said data receiving and transmitting circuit to both said memory and said new data latching circuit during the first single direct memory access control cycle period in response to the first data transfer request signal from said data receiving and transmitting circuit and for effecting data transfer by direct memory access control during a second single direct memory access control period, in response to the second data transfer signal, of one transfer unit of old data from said memory to said old data latching circuit, of one transfer unit of new data from said new data latching circuit to said comparing and storing circuit and of one transfer unit of old data from said old data latching circuit to said comparing and storing circuit, said comparing and storing circuit comparing the transfer units of new and old data and storing the comparison result during the second single direct memory access control cycle period, said direct memory access controller including a first address counter for counting, when a first frame of new data is being received, addresses of the first area as the first frame of new data is written, and a second address counter for counting addresses of the second area as a first frame of old data is read, said first address counter counting the addresses of the second area as a second frame of new data is received subsequent to the first frame of new data, while said second address counter counts the addresses of the first area as the first frame of new data is read as a second frame of old data; and processing means, separate from and operatively connected to said comparing and storing circuit, for initializing said first address counter before receiving each frame of new data to specify a head address of one of the first and second areas, for initializing said second address counter to specify a head address of the other of the first and second areas, for checking the comparison result for consecutive frames of new and old data to determine whether there is a difference between the consecutive frames of new and old data, said processing means executing software for processing the new data to indicate the monitoring result only when there is a difference in the comparison result produced by said comparing and storing circuit for the consecutive frames of new and old data, said processing means being informed of a need to process the frame of new data within one direct memory access control cycle period after all transfer units of the frame of new data have been received from the apparatus to be monitored.

* * * * *

UNITED STATES PATENT AND TRADEMARK OFFICE
CERTIFICATE OF CORRECTION

PATENT NO. : 5,319,574

DATED : June 7, 1994

INVENTOR(S) : NOBUO IKEDA

It is certified that error appears in the above-indentified patent and that said Letters Patent is hereby corrected as shown below:

Column 2, line 3, "or" should be --for--;

line 4, "he" should be --the--;

line 20, "hereafter" should be --thereafter--.

Column 4, line 40, "appllied" should be --applied--;

Column 5, line 18, "operate" should be --operated--;

line 57, "response" should be --respond--.

Column 6, line 62, "changed" should be --change--.

Column 8, line 15, delete "the" (second occurrence);

line 64, "tho" should be --the--.

Column 9, line 12, delete "the" (second occurrence);

line 18, "period. The" should be --period, the--;

line 50, delete "the" (third occurrence).

Column 10, line 7 "receives" should be --received--.

line 17, "(CH)" should be --(CH1)--.

UNITED STATES PATENT AND TRADEMARK OFFICE
CERTIFICATE OF CORRECTION

PATENT NO. : 5,319,574
DATED : June 7, 1994
INVENTOR(S) : NOBUO IKEDA

It is certified that error appears in the above-indentified patent and that said Letters Patent is hereby corrected as shown below:

Column 11, line 48, "dose" should be --does--.

Column 13, line 36, "rom" should be --from--.

Column 14, line 5, "said" should be --and--.

Signed and Sealed this

Twentieth Day of September, 1994

Attest:

BRUCE LEHMAN

Attesting Officer  Commissioner of Patents and Trademarks